(12) United States Patent
Habermann et al.

(10) Patent No.: US 8,302,043 B2
(45) Date of Patent: Oct. 30, 2012

(54) VERIFICATION OF LOGIC CIRCUIT DESIGNS USING DYNAMIC CLOCK GATING

(75) Inventors: Christian Habermann, Stuttgart (DE); Christian Jacobi, Boeblingen (DE); Matthias Pflanz, Holzgerlingen (DE); Hans-Werner Tast, Boblingen (DE); Ralf Winkelmann, Boblingen (DE)

(73) Assignee: International Business Machines Corporation, Armonk, NY (US)

( * ) Notice: Subject to any disclaimer, the term of this patent is extended or adjusted under 35 U.S.C. 154(b) by 92 days.

(21) Appl. No.: 12/876,319

(22) Filed: Sep. 7, 2010

(65) Prior Publication Data
US 2011/0066988 A1 Mar. 17, 2011

(30) Foreign Application Priority Data
Sep. 17, 2009 (DE) .................................. 09170504

(51) Int. Cl.
*G06F 17/50* (2006.01)
(52) U.S. Cl. ......... 716/106; 716/101; 716/111; 716/136
(58) Field of Classification Search .................. 716/101, 716/106, 111, 133, 136
See application file for complete search history.

(56) References Cited

U.S. PATENT DOCUMENTS

| 6,671,644 | B2 * | 12/2003 | Huisman et al. ............... 702/117 |
| 6,807,658 | B2 * | 10/2004 | Mielke et al. .................. 716/108 |
| 6,865,501 | B2 * | 3/2005 | Huisman et al. ............... 702/117 |
| 7,157,934 | B2 * | 1/2007 | Teifel et al. ..................... 326/38 |
| 7,496,788 | B1 * | 2/2009 | Alfieri et al. ..................... 714/21 |
| 7,895,488 | B1 * | 2/2011 | Bertanzetti .................... 714/728 |
| 8,065,643 | B2 * | 11/2011 | Tamiya .......................... 716/109 |
| 8,073,669 | B2 * | 12/2011 | Fernsler et al. .................. 703/18 |
| 2009/0100314 | A1 * | 4/2009 | Danninger et al. ........... 714/755 |

OTHER PUBLICATIONS

Gott et al., "Functional formal verification on designs of pSeries microprocessors and communication systems", IBM Journal Research & Development, vol. 49, No. 415, Jul./Sep. 2005, pp. 565-581.

Victor et al., "Functional verification of the POWER5 microprocessor and POWER5 multiprocessor systems", IBM Journal Research & Development, vol. 49, No. 415, Jul./Sep. 2005, pp. 541-553.

Clabes et al., "Design and Implementation of the POWER5 Microprocessor", DAC 2004, Jun. 2004 San Diego, CA, pp. 670-672.

* cited by examiner

*Primary Examiner* — Sun Lin
(74) *Attorney, Agent, or Firm* — Yee & Associates, P.C.; Diana R. Gerhardt

(57) ABSTRACT

A method and system for verifying a logic circuit design using dynamic clock gating is disclosed. The method comprises choosing at least one master seed to determine initial values as initialization for said logic circuit and/or stimuli data for at least one interface of said logic circuit, choosing at least two different dynamic clock gating configurations for every chosen master seed, executing a functional simulation with said logic circuit for every chosen dynamic clock gating configuration by using said determined initialization and/or stimuli data based on a corresponding master seed, comparing simulation results of functional simulations against each other executed with said logic circuit for at least two different chosen dynamic clock gating configurations, and reporting an error if said at least two simulation results are not identical.

15 Claims, 2 Drawing Sheets

VERIFICATION OF LOGIC CIRCUIT DESIGNS USING DYNAMIC CLOCK GATING

BACKGROUND

1. Field

The present invention relates in general to the field of verifying logic circuit designs, which are especially used in processor systems, and in particular to a method and a system for verification of logic circuit designs using dynamic clock gating, wherein the logic circuit design comprise processors, cores, units, macros and/or sub macros for example. Still more particularly, the present invention relates to a data processing program and a computer program product for verification of logic circuit designs using dynamic clock gating.

2. Description of the Related Art

Dynamic clock gating is one method for minimizing the power consumption of logic circuitries which are used in electronic devices. The main idea is to disable clocking of logic components that are currently not in use. Clocking is enabled again based on incoming stimuli data and/or signals to that logic component. Dynamic clock gating is a fine grained mechanism to enable and disable clock signals. The switching of the clocking can very well occur within hundreds of cycles.

The implementation of dynamic clock gating in logic circuits is disclosed in the IBM-Paper "Design and Implementation of the POWER5 Microprocessor" by Joachim Clabes et al, DAC 2004, Jun. 7-11, 2004, San Diego, Calif., USA, May 1, 2008, Pages 670-672, for example. Dynamic clock gating reduces the switching power with no impact on frequency or performance. However, dynamic clock gating adds additional complexity to the logic circuit design which has to behave completely independent on the dynamic clock gating configuration. Independent in this context means that cycle accurate behavior is guaranteed on all interfaces and on hardware traces.

The goal of verification of logic circuit designs is to identify problems early in the product development cycle, fix an identified problem in the design, and rerun the verification process on the modified logic circuit design. A major part of the verification effort is called functional verification. Its purpose is to verify the functional correctness of the logic circuit design. Simply put, the logic circuit does compute a corresponding correct result based on any valid input data. A proven and efficient methodology to achieve that goal is called biased random simulation. It is based on the idea of driving random but valid stimuli data on the interfaces of the design under verification. In order to be able to reproduce test cases, i.e. for debugging, all stimuli data are derived from one seed. Simulation means compute state transitions of the logic circuit design which result in changes on corresponding output signals of the logic circuit design. All changes in interface signals and/or data are observed by the verification environment and are used to make predictions and compare those predictions to the real behavior of the device under verification. Errors are flagged if the predictions and the real behavior are not equal. This approach relies on interface signals and/or data only and, for example, does not check performance behavior of the logic circuit design that is not described by the interface specification.

Functional verification methods of logic circuit designs using dynamic clock gating are disclosed in the IBM-Paper "Functional verification of the POWER5 microprocessor and POWER5 multiprocessor systems" by D. W. Victor et al, IBM J. RES. & DEV. VOL. 49, NO. 4/5, July/September 2005, Pages 541-553, and in the IBM-Paper "Functional formal verification on designs of pSeries microprocessors and communication subsystems" by R. M. Gott et al, IBM J. RES. & DEV. VOL. 49, NO. 4/5, July/September 2005, Pages 565-580, for example.

The described state of the art functional verification methods can not verify the design goal for logic circuit designs using dynamic clock gating to behave completely independent on the dynamic clock gating configuration. The state of the art verification methods only guarantee functional correctness of the logic circuit design and are not able to detect any changes in the behavior of the logic circuit design based on the dynamic clock gating configuration that could result in serious performance degradations.

An example of problems which could arise in a logic circuit design due to dynamic clock gating the Least-Recently-Used-Algorithm (LRU-Algorithm) of a cache is mentioned here. Assume that a cache is twelve way associative. Due to a clock gating problem the behavior of the LRU-Algorithm can be changed in a problematic way. The ultimate goal that the oldest cache line is chosen to be replaced by a new line does not work anymore, but a more recent line is chosen. For example, in our case the behavior changed in a way that the cache behaved as a two way associative cache only, resulting in a significant reduction in system performance.

Another example of problems which could arise in a logic circuit design due to dynamic clock gating is an arbiter. Here, incoming requests need to be prioritized in an appropriate manner to ensure good performance. In a worst case scenario, hangs, i.e. no forward progress, could occur. While hangs are already detected via the biased random stimuli data in known verification environments, performance related topics are not necessarily detected.

These two scenarios are just two examples. There are many of those in a cache design. So in previous verification environments or verification methods the impact of dynamic clock gating on the above mentioned items is not considered.

SUMMARY

The technical problem underlying the invention is to provide a method and a system for verifying a logic circuit design using dynamic clock gating, which are able to ensure that the logic circuit behaves completely independent on a dynamic clock gating configuration, and to provide a data processing program and a computer program product to perform the method for verifying a logic circuit design.

According to the invention, this problem is solved by providing a method for verifying a logic circuit design having the features of claim 1, a system for verifying a logic circuit design having the features of claim 9, a data processing program for performing the method for verifying a logic circuit design having the features of claim 14, and a computer program product causing a computer to perform the method for verifying a logic circuit design having the features of claim 15. Advantageous embodiments of the invention are mentioned in the sub claims.

Accordingly, in an embodiment of the present invention, a method for verifying a logic circuit design using dynamic clock gating comprises choosing at least one master seed to determine initial values as initialization for the logic circuit and/or stimuli data for at least one interface of the logic circuit, choosing at least two different dynamic clock gating configurations for every chosen master seed, executing a functional simulation with the logic circuit for every chosen dynamic clock gating configuration by using the determined initialization and/or stimuli data based on a corresponding master seed, comparing simulation results of functional simulations against each other executed with the logic circuit for at least two different chosen dynamic clock gating configurations, and reporting an error if the at least two simulation results are not identical.

In further embodiments of the present invention, each functional simulation is monitored and an error is also reported if a functional uncertainty is detected during the functional simulation.

In further embodiments of the present invention, the simulation results for the at least two different clock gating configurations are compared against each other relating to functional and time depending behavior, wherein any difference in the simulation results for the two different clock gating configurations is reported as error.

In further embodiments of the present invention, each simulation result comprises a simulation trace containing logical information from the at least one interface of the logical circuit.

In further embodiments of the present invention, the logical information from the at least one interface of the logical circuit is representing a coarse information level.

In further embodiments of the present invention, each simulation result of each functional simulation comprises a content of a trace array containing internal logical information of a corresponding logical circuit.

In further embodiments of the present invention, the internal logical information of the logical circuit is representing a fine information level.

In further embodiments of the present invention, a given number of master seeds are used one after the other to verify the logic circuit design.

In another embodiment of the present invention, a system for verifying a logic circuit design using dynamic clock gating comprises a verification environment which chooses at least one master seed to determine initial values as initialization for the logic circuit and/or stimuli data for at least one interface of the logic circuit, wherein the verification environment chooses at least two different dynamic clock gating configurations for every chosen master seed and executes a functional simulation with the logic circuit for every chosen dynamic clock gating configuration by using the determined initialization and/or stimuli data based on a corresponding master seed, wherein the verification environment compares simulation results of functional simulations against each other executed with the logic circuit for the at least two different chosen dynamic clock gating configurations, and reports an error if the at least two simulation results are not identical.

In further embodiments of the present invention, the verification environment monitors each functional simulation and reports also an error if a functional uncertainty is detected during the functional simulation.

In further embodiments of the present invention, each simulation result of each functional simulation comprises a simulation trace containing logical information from at least one interface of the logical circuit representing a coarse information level.

In further embodiments of the present invention, each simulation result of each functional simulation comprises a content of a trace array containing internal logical information of a corresponding logical circuit representing a fine information level.

In further embodiments of the present invention, the verification environment is using at least one random generator to determine the initial values as initialization for the logic circuit and/or stimuli for at least one interface of the logic circuit and/or the dynamic clock gating configurations.

In another embodiment of the present invention, a data processing program for execution in a data processing system comprises software code portions for performing a method for verification of logic circuit designs using dynamic clock gating when the program is run on the data processing system.

In yet another embodiment of the present invention, a computer program product stored on a computer-usable medium comprises computer-readable program means for causing a computer to perform a method for verifying logic circuit designs using dynamic clock gating when said program is run on said computer.

All in all, embodiments of the present invention disclosed herein are able to verify the design goal for logic circuit designs using dynamic clock gating to behave completely independent on the dynamic clock gating configuration. So embodiments of the present invention do guarantee functional correctness of the logic circuit design and are able to detect any changes in the behavior of the logic circuit design based on the dynamic clock gating configuration that could result in serious performance degradations.

The core idea of this invention is to use at least two simulation runs that are based on the same initialization and the same stimuli data and on different dynamic clock gating configurations and to compare the results of the at least two simulation runs against each other in a cycle accurate manner. Any difference in the results of the at least two simulation runs for the different clock gating configurations is considered to be an error.

Embodiments of the present invention can be applied, for example, on a logic circuit design that allows to disable/enable dynamic clock gating via about a few thousand (N) latches and/or registers. In theory, this results in 2 by the order of N different dynamic clock gating configurations. Obviously, no exhaustive testing is possible in a reasonable amount of time. However, in practical terms, this has only little impact on the quality of the present invention, because most of the problems in dynamic clock gating have a local scope. The number of permutations of different local clock gating configurations for a logical area which is part of the logic circuit and its direct neighbors is significantly lower, i.e. for 5 neighbors the number of different configurations would be 2 by the order of 6 (64). This is exhaustively tested, since the number of simulation runs is orders of magnitude higher.

Embodiments of the present invention decrease the error probability in the logic circuit design and lower the risk of design failures in the field for applications that require a high reliability and a high availability and a good power management.

The above, as well as additional purposes, features, and advantages of the present invention will become apparent in the following detailed written description.

BRIEF DESCRIPTION OF THE SEVERAL VIEWS OF THE DRAWINGS

Preferred embodiments of the invention, as described in detail below, are shown in the drawings, in which.

DETAILED DESCRIPTION

Figure 1:
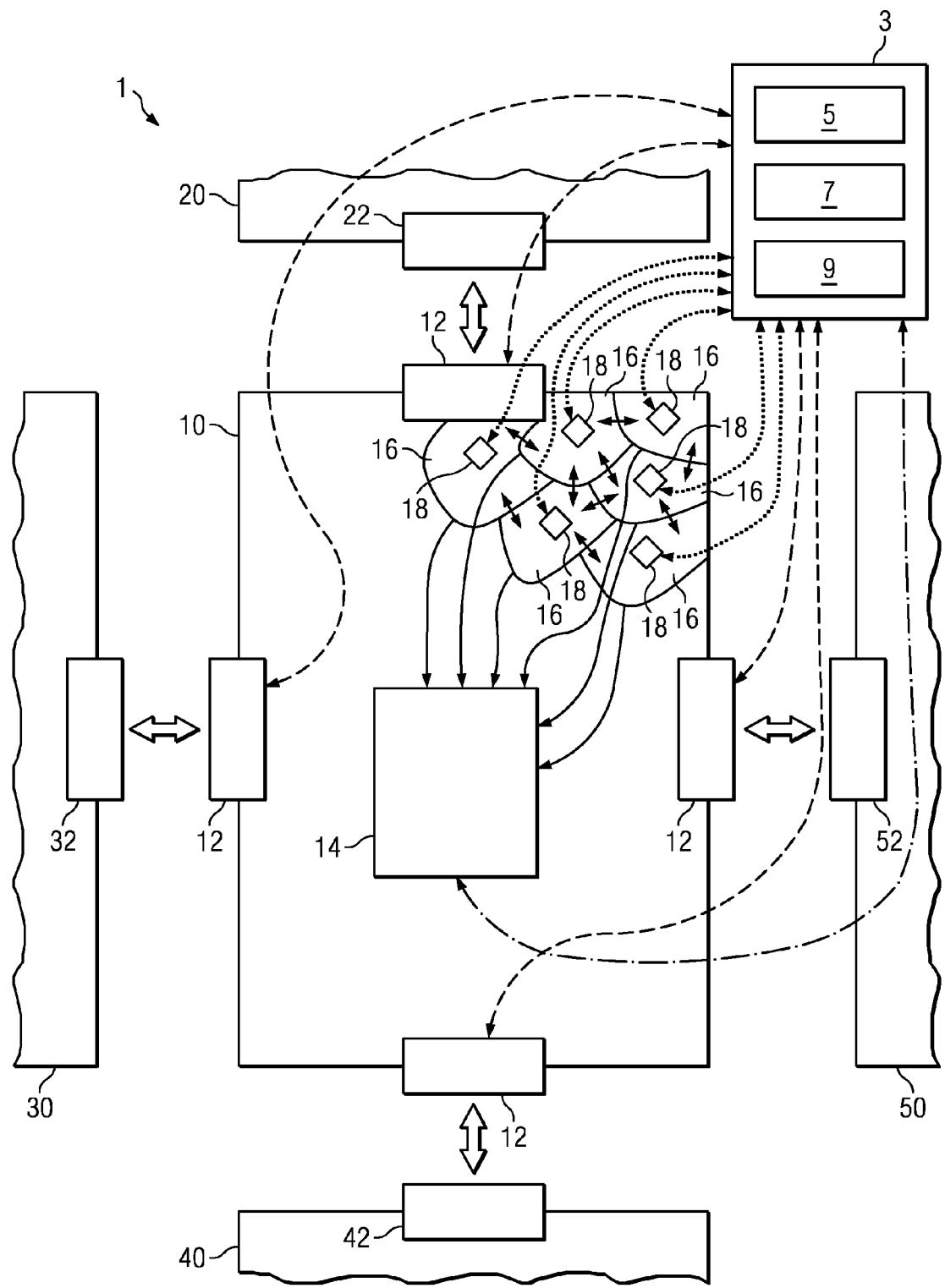
FIG. 1 is a schematic block diagram of a system for verifying a logic circuit design, in accordance with an embodiment of the present invention.

Referring to FIG. 1, the shown embodiment of the invention employs a system 1 for verifying a logic circuit design using dynamic clock gating, wherein the logic circuit design comprise processors, cores, units, macros and/or sub macros for example.

Referring to FIG. 1, the shown embodiment of the invention employs a system 1 for verifying a logic circuit design comprising a multiple of logic circuits 10, 20, 30, 40, 50 and a verification environment 3, whereas just the logic circuit 10 is shown in more detail for the purpose of clearness and a better understanding of the present invention. In the following detailed description, the invention is especially explained with regard to the logic circuit 10. According to the invention, the verification environment 3 chooses at least one master seed to determine initial values as initialization for the logic circuits 10, 20, 30, 40, 50 and/or stimuli data for at least one interface 12, 22, 32, 43, 52 of the logic circuits 10, 20, 30, 40, 50. The verification environment 3 is using at least one random generator 5 to determine the initial values as initialization for the logic circuits 10, 20, 30, 40, 50 and/or stimuli data for the interfaces 12, 22, 32, 42, 52 of the logic circuits 10, 20, 30, 40, 50. The master seed is used in order to be able to reproduce test cases. During a simulation run, state transitions of the logic circuit design are calculated which result in changes on the output data or signals. All signal changes at the interfaces 12 are observed by the verification environment 3 and are used to make predictions and compare those to the real behavior of the design under verification. The verification environment 3 monitors each functional simulation and reports an error if a functional uncertainty is detected during the functional simulation. The verification environment 3 flags an error, for example, if the predictions and the real behavior are not identical.

In the embodiment shown in FIG. 1, the logic circuit 10 comprises a multiple of logic units 16 to perform different functions inside the logic circuit 10. All of the logic units 16 comprise a register 18 used to enable and disable the dynamic clock gating for the corresponding logic unit 16 to minimize the overall power consumption of the logic circuit 10. The verification environment 3 is disabling or enabling the clocking of logic components inside of a logic unit 16 by setting or resetting the corresponding register 18 of the logic unit 16. The main idea is to disable clocking of logic components that are currently not in use. Clocking is enabled again based on incoming stimuli data from the verification environment 3 to the register 18 of the corresponding logic unit 16. The stimuli data for the registers 18 of the corresponding logic units 16 can be sent from the verification environment 3 by using communication links shown as pointed lines in FIG. 1.

The verification environment 3 chooses at least two different dynamic clock gating configurations for every chosen master seed, and executes a functional simulation with the logic circuits 10 for every chosen dynamic clock gating configuration by using the determined initialization and/or stimuli data based on a corresponding master seed. After the simulation runs, the verification environment 3 compares simulation results of the functional simulations against each other executed with the logic circuit 10 for the at least two different chosen dynamic clock gating configurations, and reports an error if the at least two simulation results are not identical. In the shown embodiment of the present invention, each simulation result of each functional simulation comprises a simulation trace containing logical information from at least one interface 12 of the logical circuit 10 representing a coarse information level. The simulation trace can also be called "software trace" and can be sent to the verification environment 3 by using communication links shown as dashed lines in FIG. 1. Additionally, each simulation result of each functional simulation comprises a content of trace array 14 containing internal logical information of the logical units 16 in a corresponding logical circuit 10 representing a fine information level. The content of the trace array 14 can also be called "hardware trace" and can be sent to the trace array 14 by using communication links shown as solid lines in FIG. 1. The "software trace" can be sent to the verification environment 3 by using a communication link shown as dashed and pointed line in FIG. 1. The logic units 16 of the logic circuit 10 are writing the internal information in the trace array 14 during the simulation run.

The idea of the present invention is to compare at least two simulation runs that are based on the same initialization and the same stimuli data in a cycle accurate manner. In the state of the art for functional verification methods, a new random seed is chosen for every simulation. In contrast, embodiments of the present invention keep the same seed, also called the master seed, for at least two simulation runs and thus generate the same stimuli data for the logic circuit 10. The initial values for the dynamic clock gating configuration registers 18 are randomly chosen by using the random generator 5. Since the random seeds from the random generator 5 are different for the at least two simulation runs, this results in different dynamic clock gating configurations. The functional verifications of the logic circuit designs during all simulation runs can be executed, for example, by following the known existing state of the art methodologies. This includes the generation of the stimuli data which depend on the master seed, monitoring the interface signals and/or data, and performing checks that ensure the functional correctness of the logic circuit design. During and/or after each simulation run, the simulation trace containing logical information from at least one interface 12 of the logical circuit 10 is written in a data file of the verification environment 3, in a first data file 7 for example, and the content of the trace array 14 containing internal logical information of a corresponding logical circuit 10 is also written in a data file of the verification environment 3, in a second data file 9 for example. In a final step, the verification environment 3 compares the simulation results of all simulations runs against each other. If there is a difference in the reported traces of the at least two simulation runs, a cycle accuracy could be broken, for example, then this could still lead to a correct functional behavior, however the verification environment 3 is recording an error, because any difference in the traces for two different clock gating configurations is considered to be an error.

Figure 2:
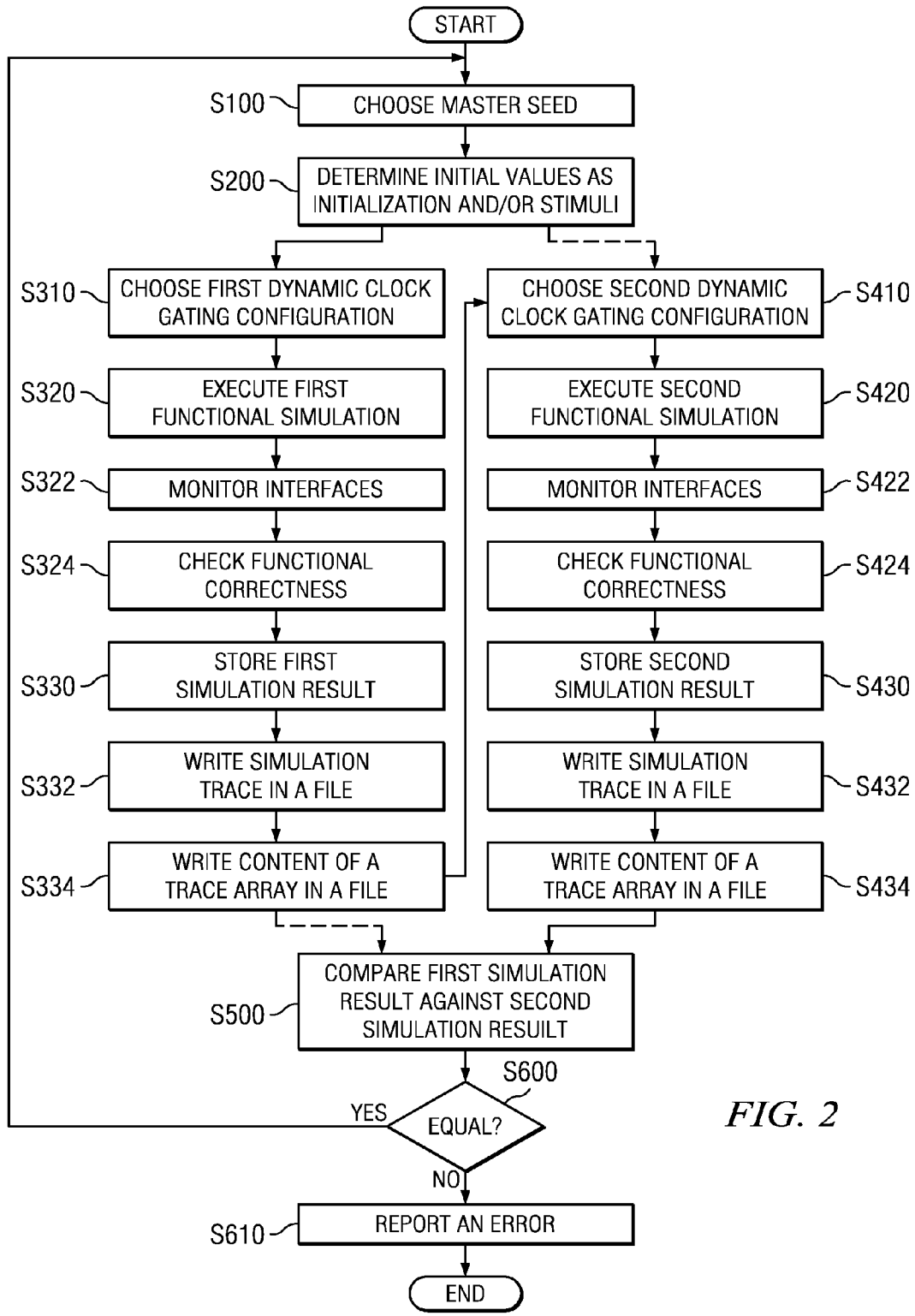
FIG. 2 is a schematic flow chart of a method for verifying a logic circuit design, in accordance with an embodiment of the present invention.

FIG. 2 is a schematic flow chart of a method for verifying a logic circuit design, in accordance with an embodiment of the present invention.

Referring to FIG. 2, the flowchart depicts that after the start of the method a master seed is chosen at step S100 to determine initial values as initialization for the logic circuits 10, 20, 30, 40, 50 and/or stimuli data for at least one interface 12, 22, 32, 42, 52 of the logic circuits 10, 20, 30, 40, 50 at step S200. In step S310, a first dynamic clock gating configuration is chosen for the chosen master seed. During step S320, a first functional simulation is executed with the logic circuit 10, 20, 30, 40, 50 for the chosen first dynamic clock gating configuration by using the determined initialization and/or stimuli data based on the master seed. During the execution of the first functional simulation, the interfaces 12, 22, 32, 42, 52 are monitored in step S322 and the functional correctness is checked in step S324. During step S330, a first simulation result is stored, wherein this storing comprises to write the simulation trace in a data file, in the first data file 7, for example, during step S332 and to write the content of the trace array 14 in a data file, in the second data file 9, for example, during step 334. In step S410, a second dynamic clock gating configuration, different from the first dynamic clock gating configuration, is chosen for the chosen master seed. During step S420, a second functional simulation is executed with the logic circuit 10, 20, 30, 40, 50 for the chosen second dynamic clock gating configuration by using the determined initialization and/or stimuli data based on the master seed. During the execution of the second functional simulation, the interfaces 12, 22, 32, 42, 52 are monitored in step S422 and the functional correctness is checked in step 424. During step S430, a second simulation result is stored, wherein this storing comprises to write the simulation trace in a data file, in the first data file 7, for example, during step S432 and to write the content of the trace array 14 in a data file, in the second data file 9, for example, during step S434. In step S500, the simulation results of the both functional simulations are compared against each other. If the simulation results are found to be not identical in step S600, an error is reported in step S610 and the verification method is stopped. If the simulation results are found to be identical in step S600, no error is reported and the method returns to step S100. A given number of master seeds are used one after the other to verify the logic circuit design, for example. The simulation results for the two different clock gating configurations are compared against each other relating to functional and time depending behavior, wherein any difference in the simulation results for the two different clock gating configurations is reported as error. Each simulation result comprises the simulation trace containing logical information from the at least one interface 12, 22, 32, 42, 52 of the logical circuit 10, 20, 30, 40, 50 representing a coarse information level. Additionally, each simulation result of each functional simulation comprises the content of the trace array 14 containing internal logical information of a corresponding logical circuit 10, 20, 30, 40, 50 representing a fine information level. In the shown embodiment of the method, only two different clock gating configurations are used for every master seed; however it is possible to use another number of different clock gating configurations for every master seed.

This method can be applied on a design that allows to disable/enable dynamic clock gating via about a few thousand (N) latches. In theory, this results in 2 by the order of N different configurations. Obviously, no exhaustive testing is possible in a reasonable amount of time. However, in practical terms, this has only little impact on the quality of this method, because most of the problems in dynamic clock gating have a local scope. The number of permutations of different local clock gating configurations for a logic unit 18 and its direct neighbors is significantly lower, i.e. for 5 neighbors the number of different configurations would be 2 by the order of 6 (64). This is exhaustively tested, since the number of simulation runs is orders of magnitude higher.

Embodiments of the invention can be used for any logic circuit such as microprocessors, cores, units, macros and/or sub macros for example regardless of its application. It can be used for consumer applications as well as for high performance devices or any other application.

The inventive method for verifying a logic circuit design can be implemented as an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method performed by a computer for verifying a logic circuit design using dynamic clock gating, comprising steps of:
the computer choosing at least one master seed to determine initial values as initialization for a logic circuit and/or stimuli data for at least one interface of said logic circuit in said logic circuit design;
the computer choosing at least two different dynamic clock gating configurations for every chosen master seed;
the computer executing a functional simulation with said logic circuit for every chosen dynamic clock gating configuration by using said determined initialization and/or stimuli data based on a corresponding master seed;
the computer comparing against each other simulation results of the functional simulations executed with said logic circuit for said at least two different dynamic clock gating configurations chosen; and
the computer reporting an error if said simulation results are not identical.

2. The method according to claim 1, wherein each functional simulation is monitored and an error is also reported if a functional uncertainty is detected during said each functional simulation.

3. The method according to claim 1, wherein said simulation results for said at least two different clock gating configurations chosen are compared against each other relating to functional and time depending behavior, wherein any difference in said simulation results for said at least two different clock gating configurations is reported as error.

4. The method according to claim 1, wherein each simulation result comprises a simulation trace containing logical information from said at least one interface of said logical circuit.

5. The method according to claim 4, wherein said logical information from said at least one interface of said logical circuit is representing a coarse information level.

6. The method according to claim 1, wherein each simulation result of each functional simulation comprises a content of a trace array containing internal logical information of a corresponding logical circuit.

7. The method according to claim 6, wherein said internal logical information of said logical circuit is representing a fine information level.

8. The method according to claim 1, wherein a given number of master seeds are used one after another to verify said logic circuit design.

9. A data processing program for execution in a data processing system comprising software code portions for performing a method for verification of logic circuit designs using dynamic clock gating according to claim 1 when said program is run on said data processing system.

10. A computer program product stored on a computer-usable medium, comprising computer-readable program code to cause a computer to perform a method to verify logic circuit designs using dynamic clock gating according to claim 1 when said program is run on said computer.

11. A system for verifying a logic circuit design using dynamic clock gating, comprising:
a verification environment that chooses at least one master seed to determine initial values as initialization for a logic circuit and/or stimuli data for at least one interface of said logic circuit in said logic circuit design, wherein said verification environment chooses at least two different dynamic clock gating configurations for every chosen master seed and executes a functional simulation with said logic circuit for every chosen dynamic clock gating configuration by using said determined initialization and/or stimuli data based on a corresponding master seed, wherein said verification environment compares against each other simulation results of the functional simulations executed with said logic circuit for said at least two different dynamic clock gating configurations chosen, and reports an error if said simulation results are not identical.

12. The system according to claim 11, wherein said verification environment monitors each functional simulation and reports also an error if a functional uncertainty is detected during said each functional simulation.

13. The system according to claim 11, wherein each simulation result of each functional simulation comprises a simulation trace containing logical information from at least one interface of said logical circuit representing a coarse information level.

14. The system according to claim 11, wherein each simulation result of each functional simulation comprises a content of a trace array containing internal logical information of a corresponding logical circuit representing a fine information level.

15. The system according to claim 11, wherein said verification environment is using at least one random generator to determine said initial values as initialization for said logic circuit and/or stimuli data for at least one interface of said logic circuit and/or said dynamic clock gating configurations.

* * * * *